E. M. SCHEIER.
SANITARY FRUIT DEPRESSOR.
APPLICATION FILED JULY 18, 1912.
1,084,114.
Patented Jan. 13, 1914.
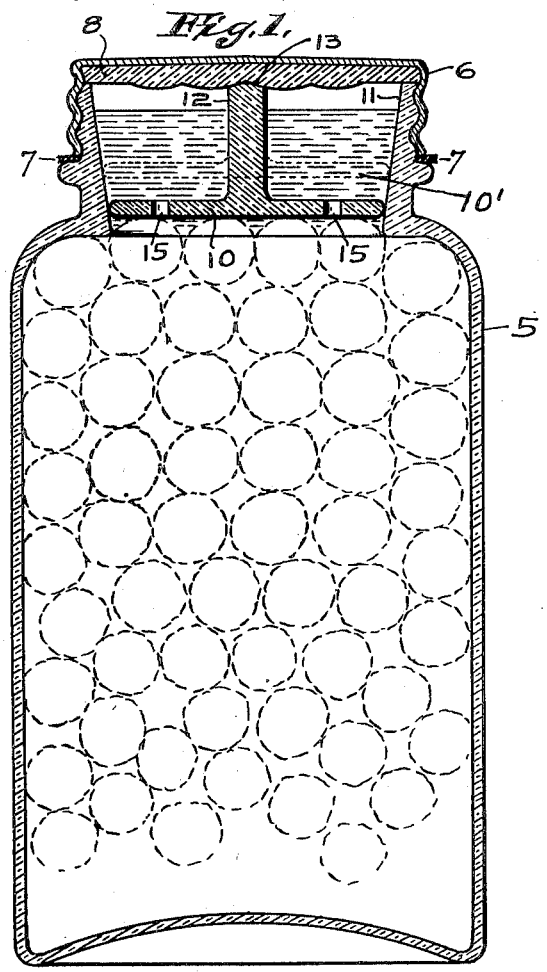
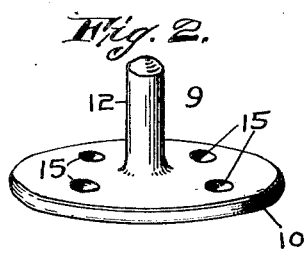
Witnesses:
L. B. Werner
J. H. Swan
Inventor,
Emilie M. Scheier,
By
Minturn T Werner
Attorneys,

UNITED STATES PATENT OFFICE.

EMILIE M. SCHEIER, OF INDIANAPOLIS, INDIANA.

SANITARY FRUIT-DEPRESSOR.

1,084,114.     Specification of Letters Patent.     Patented Jan. 13, 1914.

Application filed July 18, 1912. Serial No. 710,288.

*To all whom it may concern:*

Be it known that I, EMILIE M. SCHEIER, a citizen of the United States, residing at Indianapolis, in the county of Marion and State of Indiana, have invented certain new and useful Improvements in Sanitary Fruit-Depressors, of which the following is a specification.

This invention relates to means for depressing fruit when put up in cans, jars, bottles, or the like for future use, below the surface of the juice or syrup in which same is to be preserved, so as to prevent decomposition of the fruit and the formation of mold on same. As the fruit has a tendency to float to the top of the juice or syrup it is important to provide means for holding it below the surface, and as the juice is often in excess of the fruit contents and said fruit is retained in a loose floating condition subject to easy displacement, and as the fruit itself is often soft and yielding in its nature, and in either case unreliable for positively supporting any means by which it may be submerged below the surface of the juice, the object of my invention is not only to provide means for depressing the fruit but also to provide means for positively holding the depressing means at a given position independently of any support afforded by the fruit.

The further object is to provide means for varying the height to which the jar may be filled with fruit, and also to provide a simple, inexpensive and sanitary device for the purpose intended.

I accomplish the objects of my invention by the means illustrated in the accompanying drawing, in which—

Figure 1 is a vertical central section of a glass fruit jar containing my improvement. Fig. 2 is a perspective view of the depressing means removed from the jar.

Like characters of reference indicate like parts throughout the several views of the drawing.

5 indicates a bottle or jar of any desired or usual general type having a cover 6 and a gasket 7 for properly securing the contents against the entrance of air. The inner wall of the neck of the bottle will be oblique in cross section so that the inner wall as a whole will taper downwardly, as shown.

8 is a lining, preferably of porcelain or glass, to protect the cover 6, which is generally made out of metal, from the corrosive action of the contents of the can.

Positioned in the neck of the bottle or jar is a depressor 9 which is designed to hold down the solid or comparatively solid materials such as fruit or vegetables, that is designed to be preserved in the bottle. The depressor 9 comprises a disk-shaped member 10 which comes in contact with the fruit, and is supported by the contact of its circular edges with the oblique inner wall 11 of the jar. Extending upwardly from approximately the center of the disk 10 is a stem 12 of such length that it will be contacted by the lining 8 and pressed downwardly when the lining is clamped into position on the bottle by tightening the cover 6. The lining 8 will preferably have a central depression 13 to receive and hold the correspondingly shaped end of the stem 12 in a centered position, which will assist in keeping the disk 10 from becoming tilted. The disk 10 will thus be locked in position between the oblique walls 11 of the neck of the jar and the lining 8.

The can will be filled to any desired height above the place of the disk 10, and a free circulation of the juice will be permitted by the formation of holes 15 through the disk. The depressor 9 may be formed out of glass, porcelain or any of the non-corrosive metals, and will preferably be furnished in assorted sizes, with relation to the diameter of the disk 10 and length of stem 12 to suit varying means depending upon the desired height in the bottle of the fruit contents. Thus, when it is desired that the disk should stand at the position shown at 10′ by dotted lines in Fig. 1, the diameter of the disk will be enough greater than is shown by full lines in Fig. 1 to cause it to reach the greater diameter of the oblique inner wall of the bottle neck at that place, and the stem 12 of the depressor will be correspondingly shorter.

The depressor forming the present invention is designed to hold the fruit or vegetable contents of the jar or can from rising above it and from rising to the top of the liquid, which latter occurrence would cause it to decay or spoil, and because the depressor is positively held at a given position any desired quantity of juice may be placed in the can regardless of whether the receptacle below the lower disk of the depressor is solidly filled with fruit or not.

The great sanitary advantage of my invention is that by keeping the fruit or vegetables constantly submerged below the surface of the juice or liquid decay is prevented, and any mold that may form is kept away from the fruit, and will be the first thing drawn out by the removal of the depressor when the can is opened to reach the fruit for food.

Having thus fully described my invention, what I claim as new and wish to secure by Letters Patent of the United States, is—

The combination with a receptacle, a cap therefor, and a lining for the cap having means to center a stem, of a perforated disk having an upwardly extended integral stem which contacts with and is centered by said lining, the inner wall of the neck of the receptacle being oblique to support a disk at varying heights depending upon the diameter of the disk and the length of the disk stem.

In witness whereof, I, have hereunto set my hand and seal at Indianapolis, Indiana, this, 12th day of July, A. D. one thousand nine hundred and twelve.

EMILIE M. SCHEIER. [L. S.]

Witnesses:
F. W. WOERNER,
J. A. MINTURN.